(12) United States Patent
Ali et al.

(10) Patent No.: US 10,359,537 B2
(45) Date of Patent: Jul. 23, 2019

(54) DETERMINATION OF FLUID SATURATION IN SHALE RESERVOIRS USING NMR

(71) Applicant: Schlumberger Technology Corporation, Sugar Land, TX (US)

(72) Inventors: Mansoor Ali, Sugar Land, TX (US); Vivek Anand, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 679 days.

(21) Appl. No.: 14/728,703

(22) Filed: Jun. 2, 2015

(65) Prior Publication Data

US 2016/0356912 A1 Dec. 8, 2016

(51) Int. Cl.
*G01V 3/32* (2006.01)
*G01V 3/38* (2006.01)

(52) U.S. Cl.
CPC .................. *G01V 3/32* (2013.01); *G01V 3/38* (2013.01); *Y02A 90/344* (2018.01)

(58) Field of Classification Search
CPC .................................... G01R 3/32; G01R 3/38
USPC .................................................. 342/300–322
See application file for complete search history.

(56) References Cited

U.S. PATENT DOCUMENTS

| | | | |
|---|---|---|---|
| 6,229,308 B1 | 5/2001 | Freedman | |
| 7,053,611 B2 * | 5/2006 | Freedman | ................ G01V 3/32 324/303 |
| 7,538,547 B2 | 5/2009 | Heaton | |

FOREIGN PATENT DOCUMENTS

| | | |
|---|---|---|
| WO | 2011133859 A1 | 10/2011 |
| WO | 2013023011 A2 | 2/2013 |

* cited by examiner

*Primary Examiner* — Melissa J Koval
*Assistant Examiner* — Rahul Maini
(74) *Attorney, Agent, or Firm* — Michael Dae (57) ABSTRACT

A method of estimating fluid saturations includes obtaining amplitude values of nuclear magnetic resonance (NMR) data for a material, with each amplitude value being associated with a longitudinal magnetization recovery (T1 relaxation) time and a transverse magnetization decay (T2 relaxation) time. A mean is calculated as a function of the amplitude values and the T1 and T2 relaxation times for the amplitude values. Hydrocarbon saturation of pore space of the material is estimated as a function of the deviation of the mean from a threshold hydrocarbon saturation indicator and a threshold water saturation indicator, using the processor. Water saturation of the pore space of the material is estimated as a function of the deviation of the mean from the threshold hydrocarbon saturation indicator and the threshold water saturation indicator, using the processor.

20 Claims, 6 Drawing Sheets

DETERMINATION OF FLUID SATURATION IN SHALE RESERVOIRS USING NMR

TECHNICAL FIELD

This disclosure is related to the field of Nuclear Magnetic Resonance (NMR) well-logging tools, and more particularly, to the use of NMR well-logging tools to make measurements of fluid saturation.

BACKGROUND

Logging tools may be used in a wellbore to make, for example, formation evaluation measurements to infer properties of the formation surrounding the wellbore and the fluids contained therein. Some logging tools, known as wireline (WL) tools, are conveyed into a wellbore on a wireline cable, after the wellbore had been drilled. Other logging tools, known as logging-while-drilling (LWD) tools, can be included within a drill string, and provide for the collection of real-time or near real-time information while drilling a wellbore.

One particularly useful type of logging tool that may be embodied as either a WL tool or a LWD tool utilizes Nuclear Magnetic Resonance (NMR) to measure the response of nuclear spins in formation fluids to applied magnetic fields, and from that response evaluates various properties of the formation. These NMR tools are desirable for the accuracy of the measurements that can be made therewith, as well as for the more permissive regulatory environment surrounding NMR than some other technologies.

Such NMR tools typically have a permanent magnet that produces a static magnetic field at a desired test location (e.g., where the fluid is located). The static magnetic field produces an equilibrium magnetization in the fluid that is aligned with a magnetization vector along the direction of the static magnetic field. A transmitter antenna produces a time-dependent radio frequency magnetic field that is perpendicular to the direction of the static field. The radio frequency magnetic field produces a torque on the magnetization vector that causes it to rotate about the axis of the applied radio frequency magnetic field. The rotation results in the magnetization vector developing a component perpendicular to the direction of the static magnetic field. This causes the magnetization vector to align with the component perpendicular to the direction of the static magnetic field, and to precess around the static field.

The time for the magnetization vector to re-align with the static magnetic field is known as the longitudinal magnetization recovery time, or "T1 relaxation time".

The spins of adjacent atoms precess in tandem synchronization with one another due to the precession of the magnetization vector. The time for the precession of the spins of adjacent atoms to break synchronization is known as the transverse magnetization decay time, or "T2 relaxation time".

One formation evaluation measurement that can be taken by NMR tools is porosity, which is defined as the fraction of the bulk volume of a formation that is not occupied by the solid framework of the formation. Thus, porosity represents the percentage of the formation (i.e. pore space) that is capable of holding fluids or gases.

A related formation evaluation measurement is fluid saturation. Saturation of a given fluid in a pore space is the ratio of the volume of that fluid to the pore space volume. For example, a water saturation of 10% means that $1/10$ of the pore space is filled with water; the balance is filled with something else (oil, gas, air, etc).

Such fluid saturation measurements are therefore quite useful. Given the usefulness of fluid saturation measurements and the advantages provided by NMR tools, techniques for using NMR tools to determine fluid saturation are therefore desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A method of the disclosure contained herein includes obtaining amplitude values of nuclear magnetic resonance (NMR) data for a material, with each amplitude value being associated with a longitudinal magnetization recovery (T1 relaxation) time and a transverse magnetization decay (T2 relaxation) time. A mean is calculated using the amplitude values and the corresponding T1 and T2 relaxation times for the amplitude values, using a processor. In one configuration, the computed mean is a logarithmic mean, although another suitable mean, such as a geometric mean, may be used instead. Hydrocarbon saturation of pore space of the material is estimated as a function of the deviation of the mean from a threshold hydrocarbon saturation indicator and a threshold water saturation indicator, using the processor. Water saturation of the pore space of the material is estimated as a function of the deviation of the mean from the threshold hydrocarbon saturation indicator and the threshold water saturation indicator, using the processor.

A well-logging system in accordance with this disclosure includes a well-logging tool to transmit energy into a subsurface formation, receive NMR resonance spin echoes from the subsurface formation resulting from the transmitted energy, and perform NMR analysis to determine amplitude values of NMR data for the subsurface formation, with each amplitude value being associated with a longitudinal magnetization recovery (T1 relaxation) time and a transverse magnetization decay (T2 relaxation) time. The well-logging system includes a processor to calculate a mean as a function of the amplitude values and the T1 and T2 relaxation times for the amplitude values, and to estimate hydrocarbon saturation of pore space of the subsurface formation as a function of the deviation of the mean from a threshold hydrocarbon saturation indicator and a threshold water saturation indicator. The processor also estimates a total porosity of the subsurface formation by summing the amplitude values of the NMR data for the subsurface formation, and calculate an oil volume of the subsurface formation as a function of the hydrocarbon saturation and the total porosity.

DETAILED DESCRIPTION

The present description is made with reference to the accompanying drawings, in which example configurations are shown. However, many different configurations may be used, and thus the description should not be construed as limited to the configurations set forth herein. Rather, these configurations are provided so that this disclosure will be thorough and complete.

Figure 1:
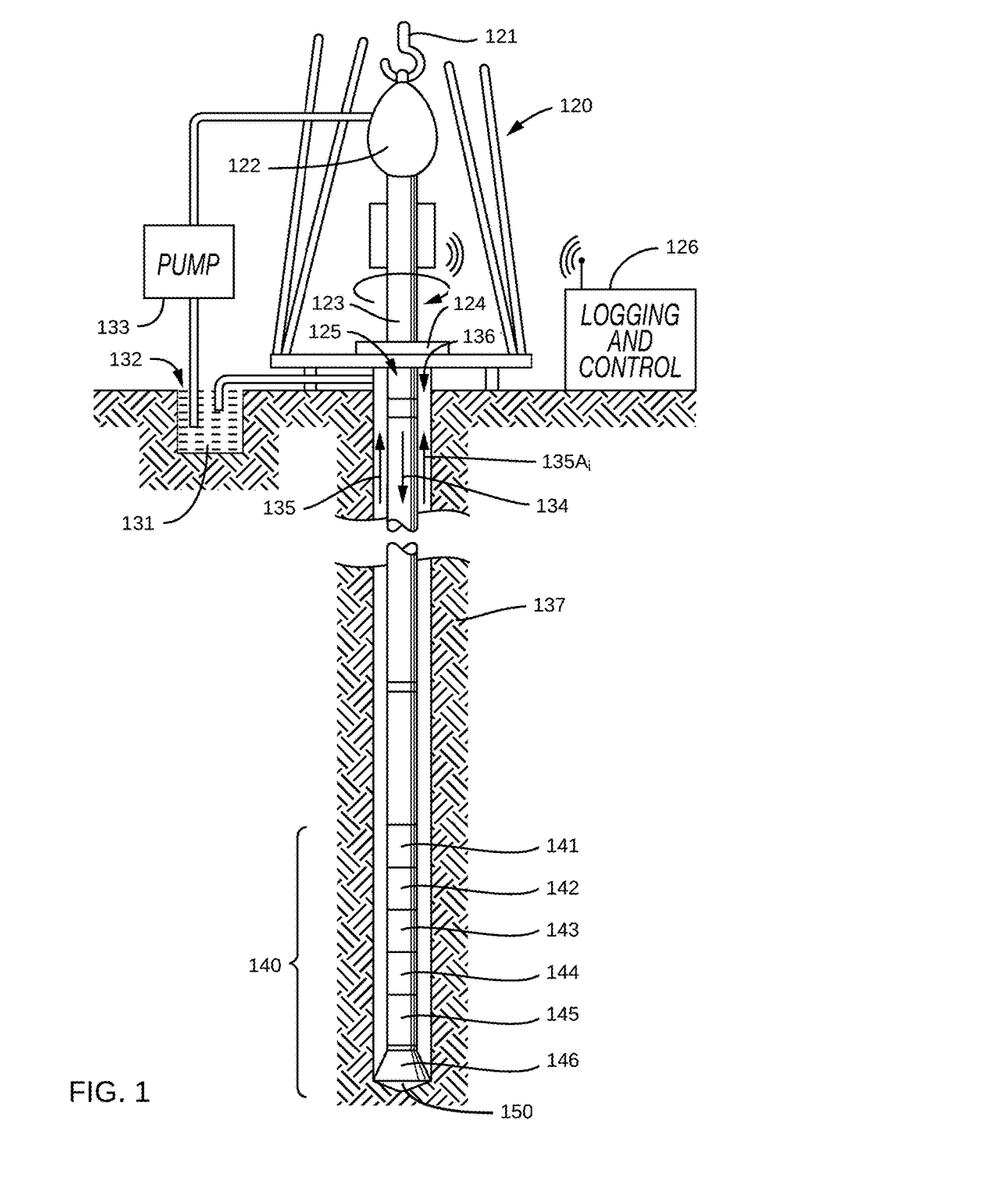
FIG. 1 is a schematic diagram, partially in block form, of a well logging apparatus on which the techniques disclosed herein may be performed.

A wellsite system which may be used to perform the methods and techniques disclosed herein is illustrated in FIG. 1. The wellsite can be onshore or offshore. In this example system, a wellbore is formed in a subsurface formation 137 by rotary drilling. A drill string 125 is suspended within a wellbore 136 and has a bottom hole assembly (BHA) 140 which includes a drill bit 146 at its lower end. A surface system 120 includes platform and derrick assembly positioned over the wellbore 136, the assembly including a rotary table 124, kelly (not shown), hook 121, and rotary swivel 122. The drill string 125 is rotated by the rotary table 124, which engages the kelly at the upper end of the drill string 125. The drill string 125 is suspended from the hook 121, attached to a traveling block (also not shown), through the kelly and the rotary swivel 122 which permits rotation of the drill string 125 relative to the hook 121. A top drive system could be used instead of the rotary table system shown in FIG. 1.

In the illustrated example, the surface system further includes drilling fluid or mud 132 stored in a pit 131 formed at the well site. A pump 133 delivers the drilling fluid to the interior of the drill string 125 via a port (not shown) in the swivel 122, causing the drilling fluid to flow downwardly through the drill string 125 as indicated by the directional arrow 134. The drilling fluid exits the drill string via ports (not shown) in the drill bit 146, and then circulates upwardly through an annulus region between the outside of the drill string 125 and the wall of the wellbore 136, as indicated by the directional arrows 135 and 135A. In this manner, the drilling fluid lubricates the drill bit 146 and carries formation cuttings up to the surface as it is returned to the pit 131 for recirculation.

The BHA 140 includes a measuring-while-drilling (MWD) tool 141, a logging-while-drilling (LWD) tool 144, a rotary steerable directional drilling system 145 and motor, and the drill bit 150. It will also be understood that more than one LWD tool and/or MWD tool can be employed, e.g. as represented at 142 and 143.

The LWD tool 144 is housed in a drill collar and contains a nuclear magnetic resonance (NMR) well-logging tool. The LWD tool 144 include capabilities for measuring, processing, and storing information, as well as for communicating with the surface equipment.

The above-described LWD tool 144 is used for collecting measurements of the formation 137. A logging and control apparatus 126, such as a processor, may be used for determining such characteristics. The processor 126 may be implemented using a combination of hardware (e.g., microprocessor, programmable logic device, etc.) and a non-transitory medium having computer-executable instructions for performing the various operations described herein. Such computer-executable instructions configure the processor 126 to be a special purpose processor for performing the techniques described herein. It should be noted that the processor 126 may be located at the well site, or it may be remotely located.

The processor 126 can be used in conjunction with the NMR device of the LWD module 144 to determine the porosity of the formation 137, as well as the saturation of water and hydrocarbons in the formation 137. A high level method of determining the water and hydrocarbon saturation of the formation 137 is now described with additional reference to the flowchart 200 of FIG. 2.

Figure 2:
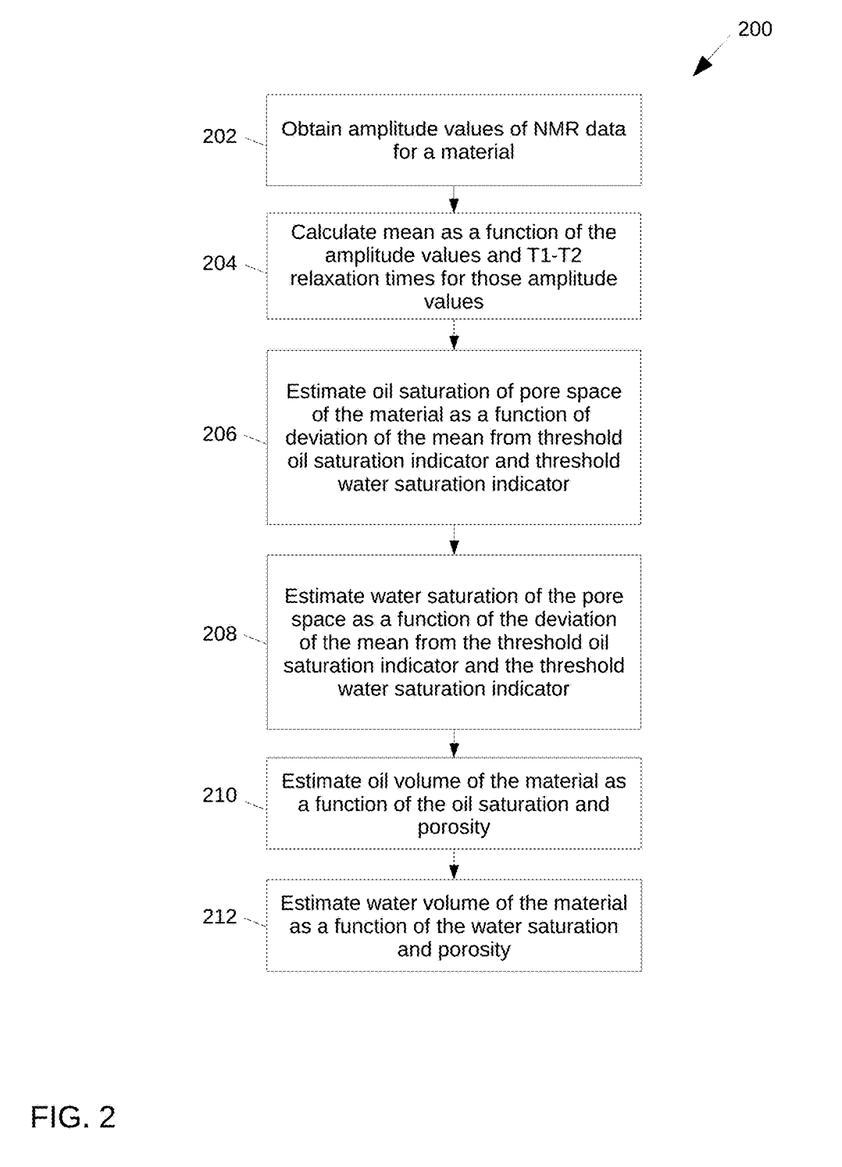
FIG. 2 is a flowchart of a method of estimating water and hydrocarbon saturation of material in accordance with this disclosure.
Figure 5:
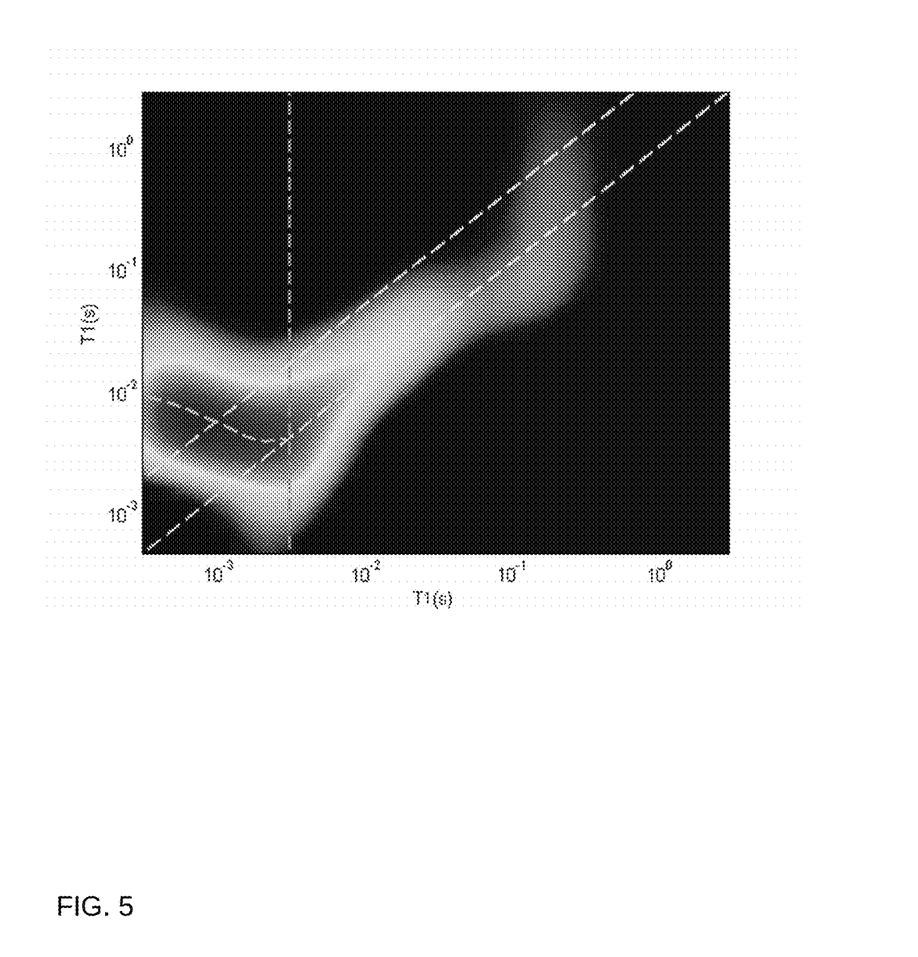
FIG. 5 is a graph plotting NMR data amplitude values along longitudinal magnetization recovery (T1) time and transverse magnetization decay (T2) time axes in which there are not distinct hydrocarbon and water peaks.

The NMR well-logging tool 144 is used to transmit energy into a subsurface formation 137 and receive NMR resonance spin echoes from the subsurface formation 137 resulting from the transmitted energy. The processor 126 performs an inversion to determine amplitude values of NMR data for the subsurface formation 137, with each amplitude value being associated with a longitudinal magnetization recovery (T1) time and a transverse magnetization decay (T2) time. Thus, amplitude values of NMR data for the subsurface formation 137 are acquired by the processor 126 (Block 202). This data can be graphically represented as shown in FIG. 5, where the grey-scale intensity of a given point represents the amplitude value thereof, where its position along the Y-axis represents the T1 relaxation time associated with that amplitude value, and where its position along the X-axis represents the T2 time associated with that amplitude value.

The T1 relaxation time for hydrocarbon rich fluid (i.e. high oil content) having a given T2 time is greater than the T1 relaxation time for hydrocarbon poor fluid (i.e. high water content) having that same given T2 time. Thus, by observing the ratio of the T1 to T2 values of a given point, it may be possible to determine whether that given point represents hydrocarbons or water.

Thus, in some instances, it is possible to directly calculate hydrocarbon saturation and water combination from the T1 to T2 ratios of each data point. However, in other instances, there are not distinct peak amplitude areas, and thus direct determination of hydrocarbon and water saturation from the T1 to T2 ratios is not possible. Such an instance is graphically represented in FIG. 5, where there are no distinct peak amplitude areas. Instances such as that of FIG. 5 may occur in shale formations, for example. In these such instances, further analysis may be performed so as to determine the hydrocarbon and water saturations.

In accordance with such further analysis, a variety of functions as will be described below are performed by the processor 126. Initially, a mean is calculated as a function of the amplitude values, as well as the T1 and T2 times for those amplitude values (Block 204). Hydrocarbon saturation of the pore space is then estimated as a function of the deviation of the mean from threshold hydrocarbon and water saturation indicators (Block 206). Similarly, water saturation of the pore space is estimated as a function of the deviation of the logarithmic mean from the threshold hydrocarbon and water saturation indicators (Block 208). The hydrocarbon and water saturation indicators are predetermined T1/T2 ratios that respectively indicate hydrocarbon rich (i.e. oil) and hydrocarbon poor (i.e. water) fluids. Sample hydrocarbon and water saturation indicators are illustrated as diagonal dashed lines in FIG. 5, for example, where the water saturation indicator is the line with a T1/T2 ratio of 1, and where the hydrocarbon saturation indicator is the line with a T1/T2 ratio of 4. These indicators may be determined from analysis of core samples using suitable techniques, by using a default known value for the formation, or by any other suitable methods. will be understood by those of skill in the art.

The hydrocarbon volume contained within the subsurface formation 137 is estimated as a function of the hydrocarbon saturation and a total porosity of the subsurface formation 137 (Block 210). The water volume contained within the subsurface formation 137 is estimated as a function of the water saturation and the total porosity (Block 212).

Figure 3:
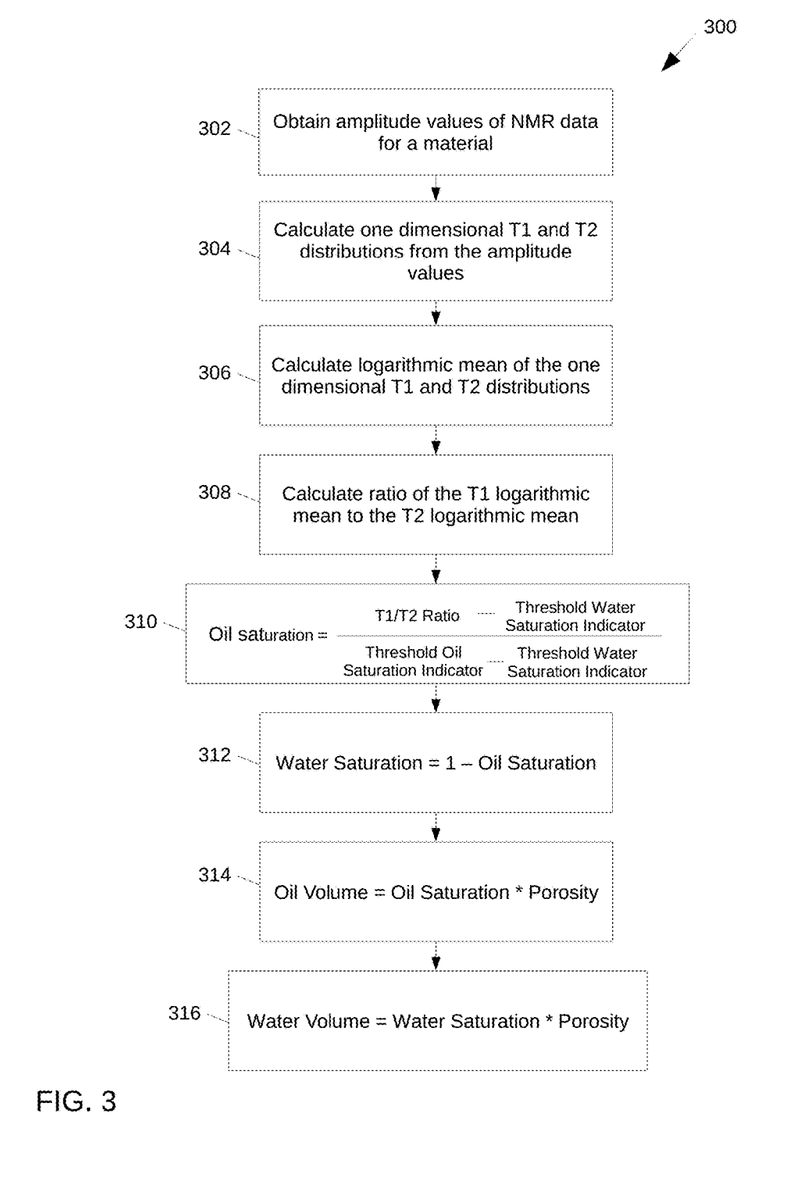
FIG. 3 is a more detailed flowchart of one way to perform the method of estimating water and hydrocarbon saturation described by the flowchart of FIG. 2.

A more detailed version of the method taught above is now described with additional reference to the flowchart 300 of FIG. 3. After the obtainment of the amplitude values (Block 302), the two dimensional NMR data as shown in FIG. 5 is collapsed into one dimension by calculating one dimensional T1 and T2 distributions from the amplitude values (Block 304). The one dimensional T1 distribution is calculated by, for each T1 value, summing each T2 value for amplitudes along the T2 axis having that T1 value. Similarly, the one dimensional T2 distribution is calculated by, for each T2 value, summing each T1 value for amplitudes along the T1 axis having that T2 value.

Mathematically, this can be represented as:

$$T1Dist(j) = \sum_{i=1}^{NT2} \phi(i, j),$$

$$j = 1, 2, \ldots, NT1$$

and $$T2Dist(i) = \sum_{j=1}^{NT1} \phi(i, j),$$

$$i = 1, 2, \ldots, NT2$$

where $\emptyset(i,j)$ refers to the amplitude of the T1T2 distribution for [T2(i),T1(j)]. The index i goes from 1 to the maximum number of T2 components (NT2) and the index j goes from 1 to the maximum number of T1 components (NT1). In some cases, the T1 and T2 distributions may be computed to a predetermined T2 cutoff value, such as shown by the dashed vertical line in FIG. 5.

Logarithmic means of the one dimensional T1 and T2 distributions are then calculated (Block 306). Mathematically, this can be represented as:

$$T1LM = 10^{\frac{\sum_{j=1}^{NT1} \log T1(j) * \phi(j)}{\sum_{j=1}^{NT1} \phi(j)}}$$

$$T2LM = 10^{\frac{\sum_{i=1}^{NT2} \log T2(i) * \phi(i)}{\sum_{i=1}^{NT1} \phi(i)}}$$

A ratio of the T1 logarithmic mean (T1LM) to the logarithmic mean (T2LM) is then calculated (Block 308). Mathematically, this can be represented as:

$$T12R = \frac{T1LM}{T2LM}$$

The hydrocarbon saturation of the pore space can then be estimated by dividing a difference between the ratio T12R and the threshold water saturation indicator by a difference between the threshold hydrocarbon saturation indicator and the threshold water saturation indicator (Block 310). Mathematically, this can be represented as:

$$So = \frac{T12R - T1T2w}{T1T2o - T1T2w}$$

where So is the hydrocarbon saturation, T1T2w is the threshold water saturation indicator, T1T2o is the threshold hydrocarbon saturation indicator.

Figure 6:
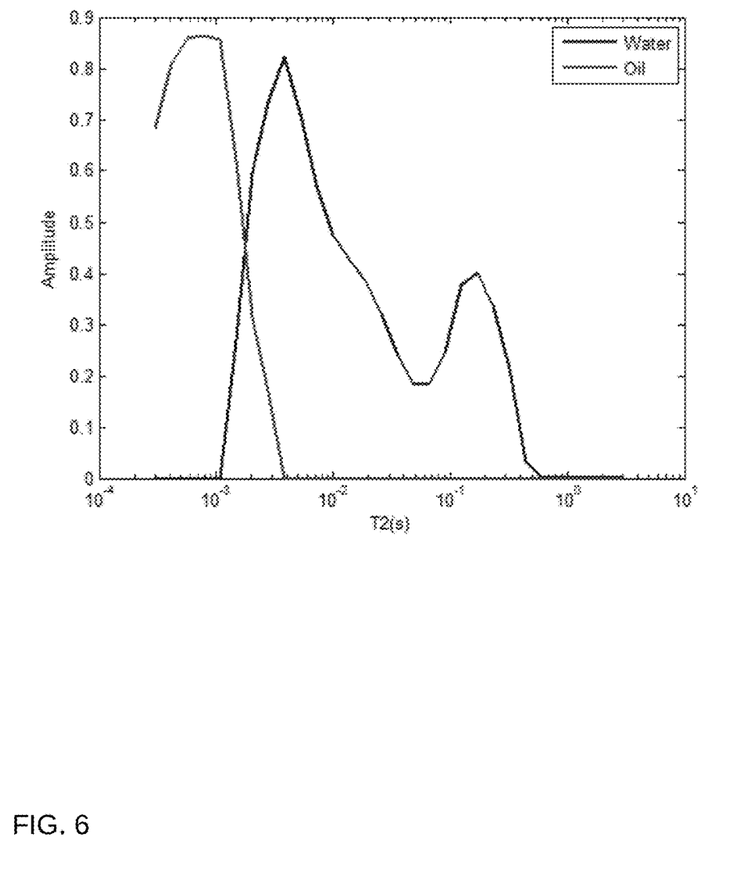
FIG. 6 is a graph plotting hydrocarbon and water saturations estimated using the techniques disclosed herein vs. T2 times.

Water saturation can then be estimated as:

$$Sw = 1 - So$$

where Sw is the water saturation (Block 312). A graph of sample hydrocarbon and water saturations estimated using the techniques disclosed above is shown in FIG. 6.

These hydrocarbon and water saturation values can then be used to estimate the oil and water volumes of the subsurface formation 137. Oil volume is estimated by multiplying the hydrocarbon saturation by the total porosity of the subsurface formation 137 (Block 314), and water volume is estimated by multiplying the water saturation by the total porosity of the subsurface formation 137 (Block 316). The total porosity of the subsurface formation 137 is estimated by summing the amplitude values of the NMR data. Mathematically, the oil volume estimation can be represented as:

$$Vo = So * \sum_{j=1}^{NT1} \sum_{i=1}^{NT2} \phi(i, j)$$

where Vo is the oil volume. Mathematically, the water volume estimation can be represented as:

$$Vw = Sw * \sum_{j=1}^{NT1} \sum_{i=1}^{NT2} \phi(i, j)$$

where Vw is the water volume.

Figure 4:
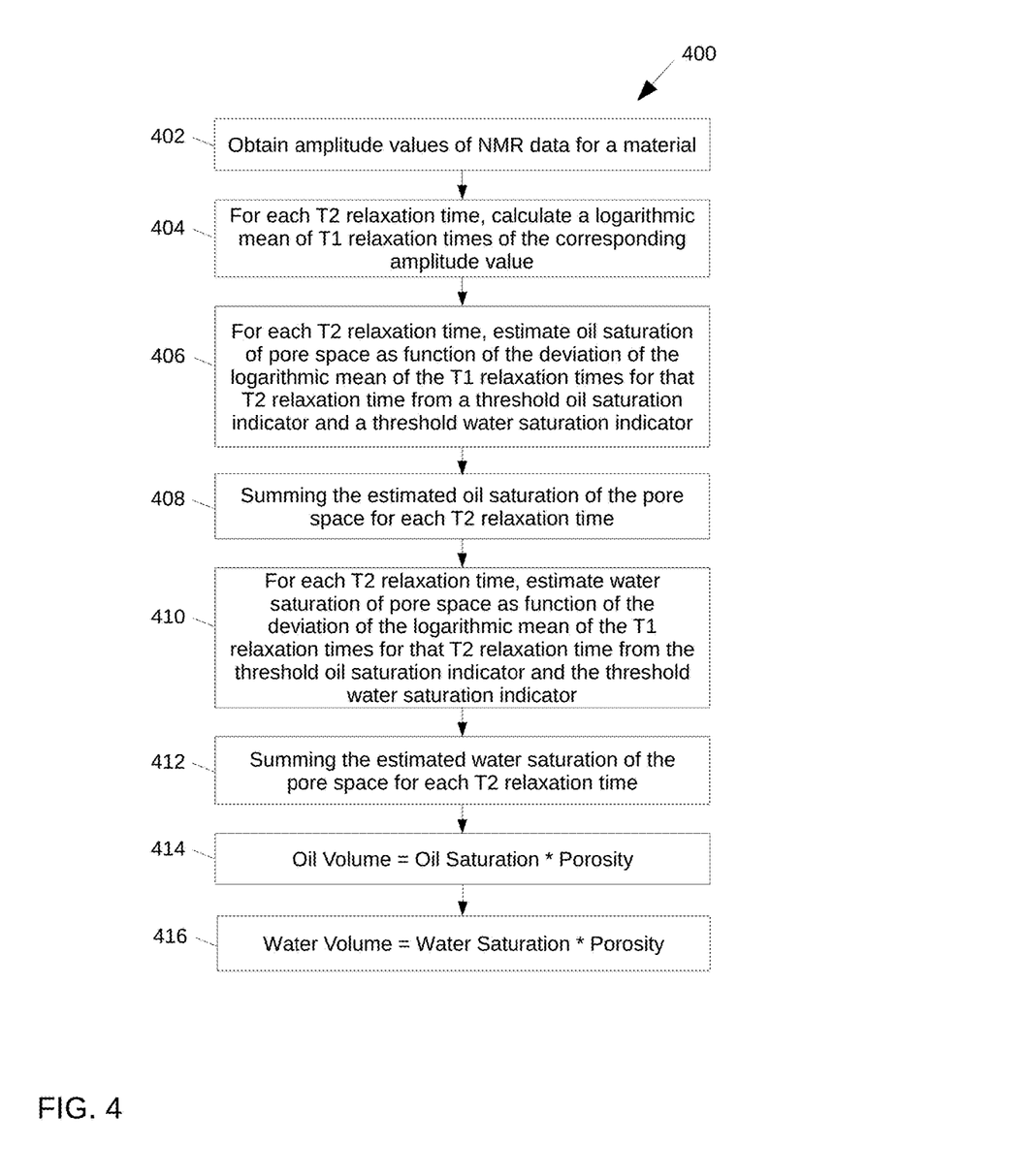
FIG. 4 is a more detailed flowchart of another way to perform the method of estimating water and hydrocarbon saturation described by the flowchart of FIG. 2.

A more detailed version of the method taught above with reference to FIG. 2 is now described with additional reference to the flowchart 400 of FIG. 4. After the obtainment of the amplitude values (Block 402), for each T2 time, a logarithmic mean of the T1 relaxation times of the corresponding amplitude value is calculated. Mathematically, this can be represented as:

$$T1LM(i) = \prod_{j=1}^{NT1} T1^{(\phi(i,j)/\sum_j \phi(i,j))},$$

$$i = 1, 2 \ldots NT2$$

where T1LM refers to the logarithmic mean, and where $\emptyset(i,j)$ refers to the amplitude at point [T2(i),T1(j)] (Block 404). The index i goes from 1 to the total number of T2 components (NT2). In some cases, computation of T1LM may be cut off at a predetermined T2cutoff value. The dashed wavy line in FIG. 5 shows the T1LM computed up to a T2 cutoff value of 3 ms (indicated by the dashed vertical line), for example.

For each T2 relaxation time, the hydrocarbon saturation of the pore space is then estimated by the processor 126 as a function of the deviation of T1LM for that T2 relaxation time from the threshold hydrocarbon saturation indicator and the threshold water saturation indicator (Block 406). This may be estimated by dividing a difference between T1LM for each T2 relaxation time and the threshold water saturation indicator for that T2 relaxation time by a difference between the threshold hydrocarbon saturation indicator for that T2 relaxation time and the threshold water saturation indicator for that T2 relaxation time. Mathematically, this can be represented as:

$$f^{oil}(i) = \frac{(T1LM(i) - T1\_w(i))}{(T1\_o(i) - T1\_w(i))},$$

where T1_w and T1_o respectively refer to the threshold water and hydrocarbon saturation indicators. To estimate the hydrocarbon saturation of the pore space, the hydrocarbon saturation for each T2 relaxation time is summed and normalized by porosity (Block 408). Mathematically, this can be represented as:

$$So = \frac{1}{\phi} \sum_i Vo(i) = \frac{1}{\phi} \sum_i f^{oil}(i) \cdot \sum_j \phi(i, j)$$

where So represents the hydrocarbon saturation of the subsurface formation, the index i goes from 1 to the total number of T2 components (NT2), the index I goes from 1 to the total number of T1 components (NT1), and Ø(i,j) refers to the amplitude at point [T2(i),T1(j)].

For each T2 relaxation time, the water saturation of the pore space is then estimated by the processor 126 as a function of the deviation of T1LM for that T2 relaxation time from the threshold hydrocarbon saturation indicator and the threshold water saturation indicator (Block 410). This may be estimated by dividing a difference between T1_w for each T2 relaxation time and T1LM for that time T2 by a difference between T1_o for that T2 relaxation time and T1_w for that time. Mathematically, this can be represented as:

$$f^{water}(i) = \frac{(T1\_o(i) - T1LM(i))}{(T1\_o(i) - T1\_w(i))},$$

where T1_w and T1_o respectively refer to the threshold water and hydrocarbon saturation indicators. To estimate the water saturation of the pore space, the hydrocarbon saturation for each T2 relaxation time is summed and normalized by porosity (Block 412). Mathematically, this can be represented as:

$$Sw = \frac{1}{\phi} \sum_i Vw(i) = \frac{1}{\phi} \sum_i f^{water}(i) \cdot \sum_j \phi(i, j)$$

where Sw represents the water saturation of the subsurface formation, the index i goes from 1 to the total number of T2 components (NT2), the index I goes from 1 to the total number of T1 components (NT1), and Ø(i,j) refers to the amplitude at point [T2(i),T1(j)]. A graph of sample hydrocarbon and water saturations estimated using the techniques disclosed above is shown in FIG. 6.

These hydrocarbon and water saturation values can then be used to estimate the oil and water volumes of the subsurface formation 137. Oil volume is estimated by multiplying the hydrocarbon saturation by the total porosity of the subsurface formation 137 (Block 414), and water volume is estimated by multiplying the water saturation by the total porosity of the subsurface formation 137 (Block 416). The total porosity of the subsurface formation 137 is estimated by summing the amplitude values of the NMR data. Mathematically, the hydrocarbon volume estimation and water volume estimation can be represented as:

$$Vo = So * \sum_{j=1}^{NT1} \sum_{i=1}^{NT2} \phi(i, j)$$

where Vo is the hydrocarbon volume. Mathematically, the water volume estimation can be represented as:

$$Vw = Sw * \sum_{j=1}^{NT1} \sum_{i=1}^{NT2} \phi(i, j)$$

where Vw is the water volume.

It should be appreciated that although obtainment of the amplitude values of the NMR data is described as involving the use of the NMR well-logging tool 144, those amplitude values may also be obtained by performing NMR analysis on a core sample in a laboratory, and the techniques described hereinabove would be applied in the same way to that NMR data. In addition, it should be understood that although the NMR well-logging tool 144 is described as being a LWD tool, the techniques and methods disclosed herein are equally applicable to a WL NMR well-logging tool as well.

Many modifications and other configurations will come to the mind of one skilled in the art having the benefit of the teachings presented in the foregoing descriptions and the associated drawings. Therefore, it is understood that various modifications and configurations are intended to be included within the scope of the appended claims.

The invention claimed is:
1. A method comprising:
obtaining amplitude values of nuclear magnetic resonance (NMR) data for a material via a downhole logging tool, each amplitude value being associated with a longitudinal magnetization recovery (T1 relaxation) time and a transverse magnetization decay (T2 relaxation) time;
calculating a mean as a function of the amplitude values and the T1 and T2 relaxation times for the amplitude values, using a processor;
estimating hydrocarbon saturation of pore space of the material as a function of the deviation of the mean from a threshold hydrocarbon saturation indicator and a threshold water saturation indicator, using the processor; and
estimating water saturation of the pore space of the material as a function of the deviation of the mean from the threshold hydrocarbon saturation indicator and the threshold water saturation indicator, using the processor.

2. The method of claim 1, wherein the mean comprises a logarithmic mean.

3. The method of claim 1, further comprising:
obtaining a porosity of the material; and
estimating an oil volume of the material as a function of the hydrocarbon saturation and the porosity, using the processor.

4. The method of claim 3, further comprising estimating a water volume of the material as a function of the water saturation and the porosity, using the processor.

5. The method of claim 3, wherein the porosity is obtained by summing the amplitude values of the NMR data for the material.

6. The method of claim 1, wherein calculating the mean comprises:
calculating a one dimensional T1 distribution from the amplitude values;
calculating a one dimensional T2 distribution from the amplitude values;
calculating a mean of the one dimensional T1 distribution; and
calculating a mean of the one dimensional T2 distribution.

7. The method of claim 6, further comprising calculating a ratio of the mean of the one dimensional T1 distribution to the mean of the one dimensional T2 distribution, using the processor; and wherein estimating the hydrocarbon saturation of the pore space comprises dividing a difference between the ratio and the threshold water saturation indicator by a difference between the threshold hydrocarbon saturation indicator and the threshold water saturation indicator.

8. The method of claim 7, wherein estimating the water saturation of the pore space comprises subtracting the hydrocarbon saturation from a total fluid saturation of the material.

9. The method of claim 1, wherein calculating the mean comprises for each T2 relaxation time, calculating a mean as a function of T1 relaxation time and the amplitude values that correspond therewith; and wherein estimating the hydrocarbon saturation of the pore space comprises for each T2 relaxation time, estimating hydrocarbon saturation of the pore space as a function of the deviation of the mean of the T1 relaxation times for that T2 relaxation time from the threshold hydrocarbon saturation indicator and the threshold water saturation indicator.

10. The method of claim 9, wherein estimating the hydrocarbon saturation of the pore space for each T2 relaxation time comprises dividing a difference between the mean of the T1 relaxation times for that T2 relaxation time and a threshold water saturation indicator for that T2 relaxation time by a difference between a threshold hydrocarbon saturation indicator for that T2 relaxation time and the threshold water saturation indicator for that T2 relaxation time.

11. The method of claim 9, wherein estimating the hydrocarbon saturation of the pore space comprises summing the estimated hydrocarbon saturation of the pore space for each T2 relaxation time.

12. The method of claim 1, wherein calculating the mean comprises for each T2 relaxation time, calculating a mean as a function of T1 relaxation time and the amplitude values that correspond therewith; and wherein estimating the water saturation of the pore space comprises for each T2 relaxation time, estimating water saturation of the pore space as a function of the deviation of the mean of the T1 relaxation times for that T2 relaxation time from the threshold hydrocarbon saturation indicator and the threshold water saturation indicator.

13. The method of claim 12, wherein estimating the water saturation for the pore space for each T2 relaxation time comprises dividing a difference between a threshold water saturation indicator for that T2 relaxation time and the mean of the T1 relaxation times for that T2 relaxation time by a difference between a threshold hydrocarbon saturation indicator for that T2 relaxation time and the threshold water saturation indicator for that T2 relaxation time.

14. The method of claim 12, wherein estimating the water saturation of the pore space comprises summing the estimated water saturation of the pore space for each T2 relaxation time.

15. The method of claim 1, wherein the material comprises a core sample; and wherein the amplitude values are obtained using a NMR machine.

16. The method of claim 1, wherein the material comprises a subsurface formation; and wherein the amplitude values are obtained by placing a NMR tool in a wellbore penetrating the subsurface formation and logging the subsurface formation using the NMR tool.

17. A well-logging system comprising:
a well-logging tool configured to transmit energy into a subsurface formation, receive NMR resonance spin echoes from the subsurface formation resulting from the transmitted energy, and perform NMR analysis to determine amplitude values of NMR data for the subsurface formation, each amplitude value being associated with a longitudinal magnetization recovery (T1) time and a transverse magnetization decay (T2) time; and
a processor configured to:
calculate a mean as a function of the amplitude values and the T1 and T2 relaxation times for the amplitude values;
estimate hydrocarbon saturation of pore space of the subsurface formation as a function of the deviation of the mean from a threshold hydrocarbon saturation indicator and a threshold water saturation indicator;
estimate a total porosity of the subsurface formation by summing the amplitude values of the NMR data for the subsurface formation; and
calculate an oil volume of the subsurface formation as a function of the hydrocarbon saturation and the total porosity.

18. The well-logging system of claim 17, wherein the processor calculates the mean by:
calculating a one dimensional T1 distribution from the amplitude values;
calculating a one dimensional T2 distribution from the amplitude values;
calculating a mean of the one dimensional T1 distribution; and
calculating a mean of the one dimensional T2 distribution.

19. The well-logging system of claim 18, wherein the processor is further configured to calculate a ratio of the mean of the one dimensional T1 distribution to the mean of the one dimensional T2 distribution; and wherein the processor estimates the hydrocarbon saturation of the pore space by dividing a difference between the ratio and the threshold water saturation indicator by a difference between the threshold hydrocarbon saturation indicator and the threshold water saturation indicator.

20. The well-logging system of claim 18, wherein the processor calculates the mean by, for each T2 relaxation time, calculating a mean as a function of T1 relaxation time and the amplitude value that corresponds therewith; and wherein the processor estimates the hydrocarbon saturation of the pore space by for each T2 relaxation time, estimating hydrocarbon saturation of the pore space as a function of the deviation of the mean of the T1 relaxation times for that T2 relaxation time from the threshold hydrocarbon saturation indicator and the threshold water saturation indicator.

* * * * *